United States Patent
Ginis et al.

(10) Patent No.: US 10,346,204 B2
(45) Date of Patent: Jul. 9, 2019

(54) CREATING MODELS BASED ON PERFORMANCE METRICS OF A COMPUTING WORKLOADS RUNNING IN A PLURALITY OF DATA CENTERS TO DISTRIBUTE COMPUTING WORKLOADS

(71) Applicant: BMC SOFTWARE, INC., Houston, TX (US)

(72) Inventors: Boris Ginis, Brighton, MA (US); William Northup, Portland, OR (US); Anthony DiStauro, Milford, MA (US); Kevin Fernandes, Acton, MA (US)

(73) Assignee: BMC Software, Inc., Houston, TX (US)

( * ) Notice: Subject to any disclaimer, the term of this patent is extended or adjusted under 35 U.S.C. 154(b) by 215 days.

(21) Appl. No.: 15/272,011

(22) Filed: Sep. 21, 2016

(65) Prior Publication Data

US 2018/0081726 A1    Mar. 22, 2018

(51) Int. Cl.
| | | |
|---|---|---|
| *G06F 9/50* | (2006.01) | |
| *G06F 11/30* | (2006.01) | |
| *G06F 11/34* | (2006.01) | |

(52) U.S. Cl.
CPC ........ *G06F 9/5005* (2013.01); *G06F 11/3006* (2013.01); *G06F 11/3414* (2013.01); *G06F 11/3447* (2013.01); *G06F 11/3476* (2013.01)

(58) Field of Classification Search
CPC .......................... G06F 17/5009; G06F 9/5005
See application file for complete search history.

(56) References Cited

U.S. PATENT DOCUMENTS

| | | | | |
|---|---|---|---|---|
| 7,730,091 B2* | 6/2010 | Buckler | ................ | G06F 16/285 707/782 |
| 2006/0143611 A1* | 6/2006 | Sadiq | ..................... | G06Q 10/06 718/100 |
| 2012/0197609 A1* | 8/2012 | Wu | ........................ | G06Q 10/04 703/2 |
| 2013/0081005 A1* | 3/2013 | Gounares | .............. | G06F 9/5016 717/148 |

* cited by examiner

Primary Examiner — James J Lee
Assistant Examiner — Jorge A Chu Joy-Davila
(74) Attorney, Agent, or Firm — Brake Hughes Bellermann LLP (57) ABSTRACT

A system includes, for each individual data center of a multiplex data center, a collector component, a local data repository, and a model building component. The collector component collects performance metrics of a computing workload running in the each individual data center of the multiplex data center and stores the collected performance metrics in the local data repository. The model building component builds a respective individual model of data center resource use for each individual CPC in the individual data center using the stored performance metrics. The system further includes a model merging component configured to receive and combine the individual CPC models created by the model building components for the individual data centers into a single multiplex data center model applicable to the computing workload across the multiplex data center.

26 Claims, 9 Drawing Sheets

```
┌─────────────────────────────────────────────────────────────┐
│ Monitoring use of data center resources by the customer     │
│ computing work load over a predetermined time interval,     │
│ individually for each individual data center in the         │──710
│ multiplex data center and collectively over all of data     │
│ centers in the multiplex data center over which the         │
│ customer's computing workload is run                        │
└─────────────────────────────────────────────────────────────┘
                              │
                              ▼
┌─────────────────────────────────────────────────────────────┐
│ At each individual data center in the multiplex data        │
│ center, collecting performance metrics (e.g., performance   │──720
│ activity data) of the customer's computing workload         │
│ running in the data center                                  │
└─────────────────────────────────────────────────────────────┘
                              │
                              ▼
┌─────────────────────────────────────────────────────────────┐
│ Storing the collected performance metrics for each          │
│ individual data center, for example, in a local repository  │──730
└─────────────────────────────────────────────────────────────┘
                              │
                              ▼
┌─────────────────────────────────────────────────────────────┐
│ For each individual data center, assembling or building     │
│ respective individual models of data center resource use    │──740
│ for each of the individual CPCs in the data center using    │
│ the stored performance metrics                              │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ┐  │
│    Mapping all versions of each product found in the        │
│  │ data for an individual CPC into its corresponding     │  │
│    product family 742                                       │
│  └ ─ ─ ─ ─ ─ ─ ─ ─ ─ ─ ─ ─ ─ ─ ─ ─ ─ ─ ─ ─ ─ ─ ─ ─ ─ ─ ─ ┘  │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ┐  │
│    Defining or creating an artificial "aggregated" product  │
│  │ (aggregated at the CPC level) to represent all       │  │
│    versions of the product on this CPC and including the    │
│  │ aggregated product in the individual CPC model as    │  │
│    representing all versions of the product on the          │
│  │ individual CPC 744                                    │  │
│  └ ─ ─ ─ ─ ─ ─ ─ ─ ─ ─ ─ ─ ─ ─ ─ ─ ─ ─ ─ ─ ─ ─ ─ ─ ─ ─ ─ ┘  │
└─────────────────────────────────────────────────────────────┘
                              │
                              ▼
                          Continued
```

Combining the individual CPC models for the data centers in the multiplex data centers (including the individual CPC models with aggregated products) into a single multiplex data centers model — 750

Mapping each product found in the individual CPC models to a corresponding product family 752

When multiple products are found in the data that map to the same product family, defining or creating an artificial "aggregated" product (aggregated at the multiplex level) to represent these multiple products and additionally including the aggregated product in the single multiplex data centers model as representing these multiple products in the multiplex data centers 754

Making the single multiplex data centers model available to other users (e.g., a planning tool or a customer) in one or two user-selectable versions or modes (i.e. a multiplex data centers version of the model or an individual CPC version of the model) — 760

If the multiplex data centers version is to be made available, filtering out of the single multiplex data centers model all individual software products that are also represented by an aggregated product (e.g., at the CPC level or the multiplex level) in the single multiplex data centers model 762

If the individual data center version is to be made available, filtering out of the single multiplex data centers model all aggregated products and leaving only individual software products in the model 764

FIG. 7 (cont.)

CREATING MODELS BASED ON PERFORMANCE METRICS OF A COMPUTING WORKLOADS RUNNING IN A PLURALITY OF DATA CENTERS TO DISTRIBUTE COMPUTING WORKLOADS

TECHNICAL FIELD

This description relates to distributing computing workload in computer systems.

BACKGROUND

A mainframe computer may be viewed as a central processor complex (CPC), which is a physical collection of hardware that consists of main storage, one or more central processors, timers, and channels.

Enterprises and organizations often rely on mainframe computers for their computing needs, for example, for critical applications, bulk data processing such as census, industry and consumer statistics, enterprise resource planning, and transaction processing. Instead of maintaining their own mainframe computer installations, the enterprises and organizations (hereinafter "mainframe customers") may get a license to run software products or applications utilizing processing capacity in a mainframe computer installation or environment maintained by an external vendor.

A logical partition, commonly called an LPAR, is a subset of a computer's hardware resources (e.g., processors, memory, and storage), virtualized as a separate computer. In effect, a physical mainframe computer can be partitioned into multiple logical partitions, each hosting a separate operating system instance. A mainframe computer may support one or more LPARs for computing work. Many applications may be run or executed concurrently on an LPAR in a mainframe environment.

A mainframe computer installation (hereinafter "data center") may divide processing capacity availability physically by central processor complexes ("CPCs") and logically by logical partitions. Under common license arrangements (e.g. IBM's Monthly License Charge (MLC)), a mainframe customer may obtain a license to use a limited amount of processing capacity, for example, on one or more LPARs of the CPCs in a data center to run specific software products (e.g., DB2, CICS, WebSphere, Z/OS, IMS. etc.). The licensed processing capacity, which may be measured in terms of million service units (MSUs), may be a function of the individual LPAR, time of use, the individual software product used, etc. The licensed processing capacity may include a monthly maximum or total capacity limit for peak use across all CPCs and LPARs in a data center.

Under some license arrangements, the mainframe customer may obtain licensed processing capacity with a regional or country maximum capacity limit to run the software products (e.g., DB2, CICS, WebSphere, Z/OS, etc.) across all CPCs and LPARs in a plurality of data centers in a region or country.

Consideration is now being given to monitoring processing capacity use and managing distribution of the customer's computing workload across multiple data centers.

SUMMARY

A system for monitoring, analyzing, and modeling use of data center resources by a computing workload (e.g., a customer's computing workload) includes instructions stored on a non-transitory computer readable storage medium and executable by at least one processor. The data center resources and the computing workload may be distributed across several individual data centers, for example, in an arrangement of multiple data centers ("multiplex of data centers") in a region or country.

In an aspect, the system includes, for each individual data center of the multiplex data center, a collector component configured collect performance metrics of a computing workload running in the individual data center and a local data repository configured to store the collected performance metrics.

In another aspect, the system includes, for each individual data center, a model building component configured to build a respective individual model of data center resource use for each individual central processor complex ("individual CPC") in the individual data center using the stored performance metrics.

In a further aspect, the system includes a model merging component configured to receive and combine the individual CPC models, created by the model building components for the individual data centers of the multiplex of data centers, into a single combined model applicable to the computing workload across the multiplex of data centers.

In an example implementation, the system may include a reporting process component configured to make the single combined model available to users in user-selectable versions (e.g., a "multiplex-data-centers" version of the single combined model or an "individual-data-centers" version of the single combined model).

The details of one or more implementations are set forth in the accompanying drawings and the description below. Other features will be apparent from the description and drawings, and from the claims.

DETAILED DESCRIPTION

The systems and methods (collectively "data center resource use solutions") described herein provide planning tools for managing use of data center resources by a customer's computing workload across multiple data centers (e.g., multiple data centers in a region or country). The multiple data centers may include individual data centers that are operationally distinct from each other and are possibly at diverse locations remote from each other in the region or country.

For convenience in description herein, the multiple data centers in which the customer's computing workload can be run may be referred to as "the multiplex," "the multiplex of data centers," or "multiplex data centers." Each of the individual data centers in the multiplex may include one or more CPCs over which the customer's computing workload may be distributed. The customer's computing workload may utilize different software products, which may be run concurrently, sequentially, or at overlapping times on different CPCs (or LPARs) in each of the individual data centers.

The customer may have obtained limited processing capacity to run the customer's computing workloads in the multiplex with a respective processing capacity use limit applicable to processing capacity use in each individual data center, or optionally a "multiplex" processing capacity use limit applicable to the combined or total processing capacity use across all of the multiplex data centers. The processing capacity use limits may be applicable to individual software products or product versions (e.g., DB2 version 7, etc.) that may be licensed to the customer for use by the customer's computing workloads in an individual data center or CPC. In some instances, the multiplex processing capacity use limit may be applicable to an entire software product family (i.e. all versions of a software product such as DB2 version 7, DB2 version 9, etc.) that may be licensed to the customer for use by the customer's computing workloads across all of the multiplex data center.

Vendor-supplied tools or facilities may be available to record performance activity metrics and determine actual utilization of data center resources by the customer's computing workloads in the data centers. For example, IBM's resource management facility (RMF) can collect performance activity data from subsystems and software program products (e.g., CICS, DB2, MQ, WebSphere Application Server, etc.) in z/OS and SYSPLEX environments. Further, for example, IBM's System Management Facility (SMF) or other tools (e.g., BMC's CMF tool) may provide standardized methods for writing out records of computing activity to a file. The vendor may charge the customer for using the data centers based on the actual data center resources used, which may be determined from the recorded performance metrics. The recorded performance metrics used for this purpose may, for example, include a rolling average of CPU consumption (e.g., a peak rolling 4 hour average (R4HA), measured in MSUs).

The data center resource use solutions described herein may be configured to monitor, analyze and model data center resource use by the customer's computing workload, in accordance with the principles of the present disclosure. Use of data center resources by the customer's computing workload may be monitored over a predetermined time interval, individually for each individual data center or CPC, and collectively over all of the multiplex data centers over which the customer's computing workload is distributed. The data center resource use solutions may include collecting and recording performance metrics of the customer's computing workload run in each individual data center, and generating models of data center resource use by the customer's computing workload. The generated models may illustrate time-dependent uses of data center resources by the customer's computing workload. The generated models may, for example, include a normalized aggregation of time-based workload representations (e.g. one or more performance metrics) within a defined time interval.

The generated models may be predictive and may be used, for example, in a planning tool to distribute the computing workload in individual data centers and across multiplex data centers for efficient and economic use of data center resources. The planning tool may, for example, evaluate a potential change of a data center resource used for the computing workload based on a response of the models to the potential change.

Figure 1:
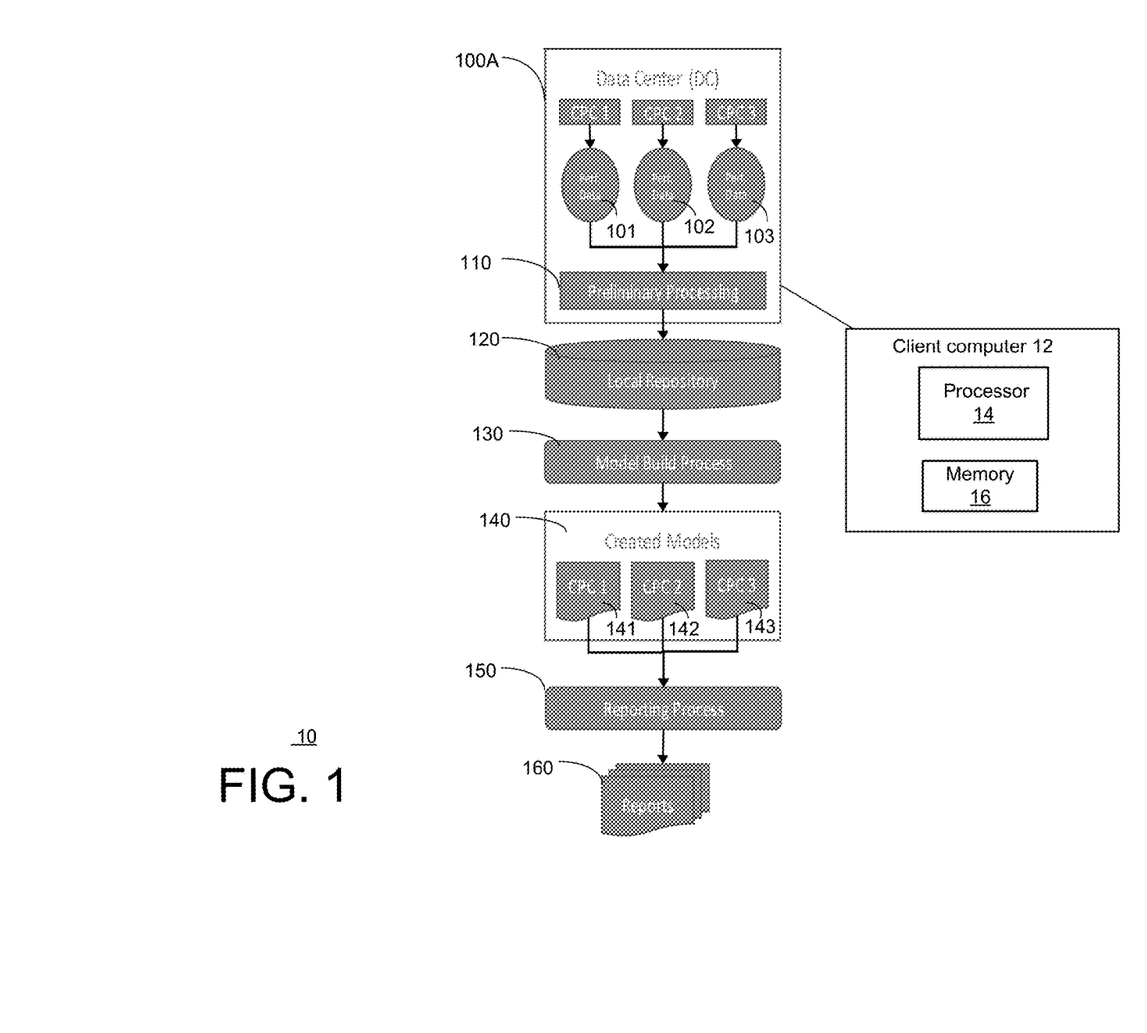
FIG. 1 is a block diagram that illustrates aspects of an example system for monitoring, analyzing, and modeling data center resource use by a customer's computing workload across CPCs (or LPARs) in an individual data center, in accordance with the principles of the present disclosure.

FIG. 1 shows a block diagram illustration of an example system 10 for monitoring, analyzing and modeling data center resource use by a customer's computing workload across CPCs (or LPARs) in an individual data center (e.g., data center 100A).

As shown in FIG. 1, data center 100A may include, for example, three individual CPCs (e.g., CPC 1, CPC 2 and CPC 3) on which the customer's computing workload can be run. System 10 may be configured to collect raw performance data for each of the software products used and for each of the CPCs in the data center. The raw performance data may be collected using performance data collection and recording tools or facilities (e.g., RMF or SMF) that may be available in data center 100A. The SMF data collected for CPU use, paging, and I/O activity may, for example, include type 30 records for job and job step processor resource use, and types 70-79 RMF records. The raw performance data for CPC 1, CPC 2 and CPC 3 collected at data center 100A is shown in FIG. 1, for example, as "perf. data 101," "perf. data 102" and "perf. data 103," respectively.

System 10 may further include a preliminary processing component 110 coupled to a local data repository 120, a model building component 130, and a reporting process component 150. One or more of these components may be hosted, for example, on a client computer (e.g., client computer 12). Client computer 12, which may be connected to data center 100A, may include a processor 14 and a memory 16.

Preliminary processing component 110 may be configured to process the raw performance data collected for CPC 1, CPC 2 and CPC 3 (e.g., perf. data 101, perf. data 102 and perf. data 103, respectively) into formats suitable for input to model building component 130. Preliminary processing component 110 may, for example, aggregate, filter, compress and normalize the raw performance data and store the processed performance data in a local data repository 120 for input to model building component 130. Model building component 130 may use this processed performance data to assemble or build models 140 of data center resource use (e.g. model 141, model 142 and model 142, respectively) for each of CPC 1, CPC 2 and CPC 3 in data center 100A. The models (e.g. model 141, model 142 and model 142, respectively), which may be predictive, may be used in a planning tool (e.g., by the customer) to create, schedule, execute, delay, or otherwise manage workloads to efficiently and economically use data center resources within data center 100A.

System 10 may further include, for example, a reporting process component 150, which may be configured to make the models (e.g. model 141, model 142 and model 142, respectively) built by model building component 130 available to the customer or other users, for example, as reports 160.

Figure 2:
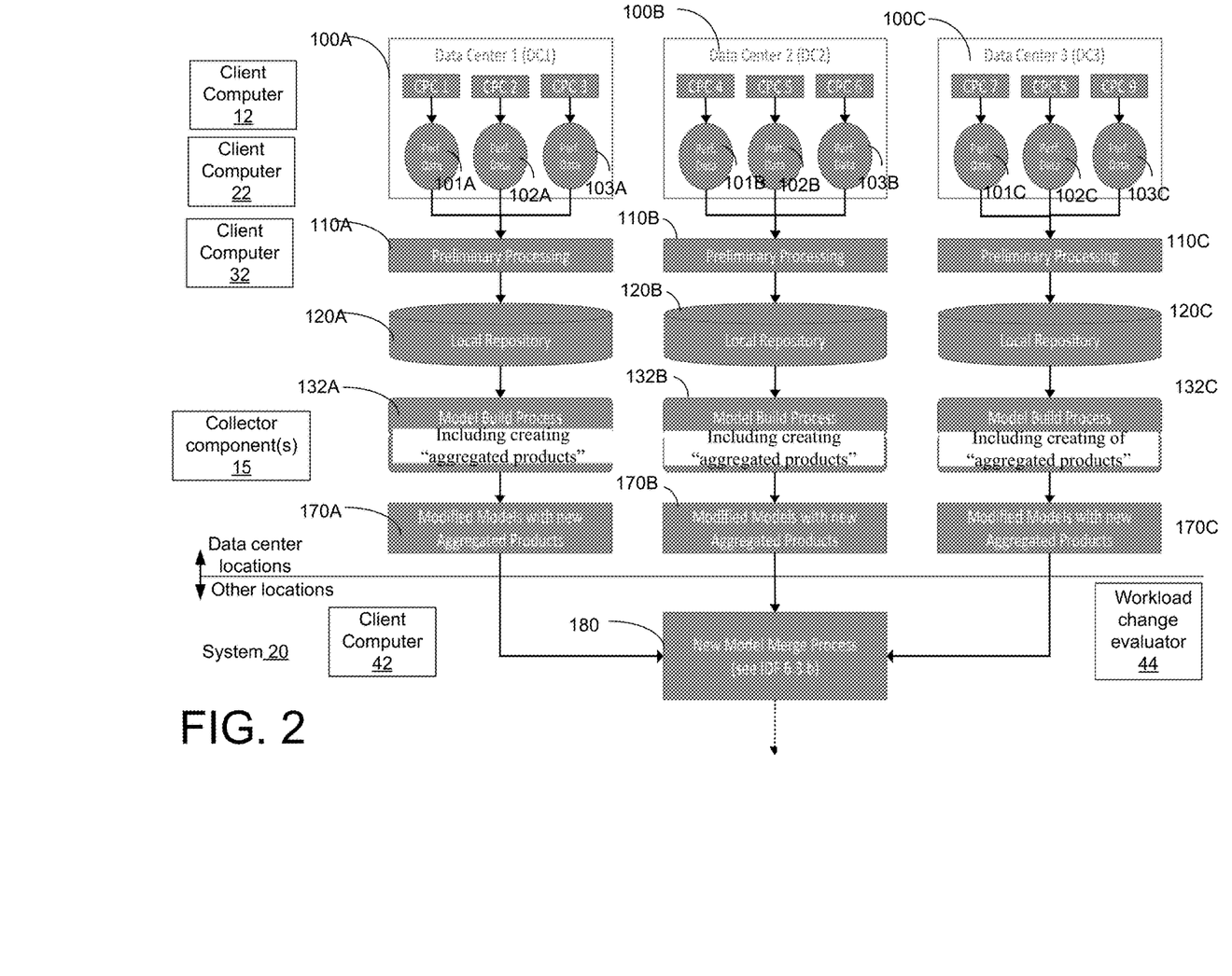
FIG. 2 is a block diagram that schematically illustrates aspects of an example system for monitoring, analyzing, and modeling use of data center resources by a computing workload across CPCs (or LPARs) in a multiplex of data centers in a region or country, in accordance with the principles of the present disclosure.

FIG. 2 is a block diagram which schematically illustrates aspects of an example system 20 for monitoring, analyzing, and modeling use of data center resources by a customer's computing workload across CPCs (or LPARs) in a multiplex data center (e.g., data center 100A, data center 100B, data center 100C, etc.) in a region or country, in accordance with the principles of the present disclosure.

The multiplex data center in the region or country may include any number of individual data centers (e.g., data center 100A, data center 100B, data center 100C, etc.). The customer may have obtained limited processing capacity to run the customer's computing workloads on one or more of the multiplex data centers with a respective processing capacity use limit applicable to processing capacity use on each individual data center (e.g., data center 100A, data center 100B, data center 100C, etc.) or optionally, a "multiplex" processing capacity use limit applicable to the combined or total processing capacity use across all of the multiplex data centers (e.g., data center 100A, data center 100B, and data center 100C). Use of a software product (e.g., DB2 version 6) in an individual data center (e.g., data center 100A) may be treated as an instance of licensed use of the software product only in the individual data center (e.g., data center 100A), or, alternatively, as an instance of licensed use of the software product family (e.g., DB2 version 1, DB2 version 3, etc.) in any of the multiplex data centers (e.g., data center 100A, data center 100B, data center 100C, etc.). In example implementations, each individual software product, which may have licensed use as part of a respective software product family across the multiplex data centers, may be characterized or identified by a "Product Family" property or attribute and a "Version ordinal number" property or attribute.

System 20 may use a product map and a family map to identify individual software products whose use is covered by licenses to software product families in the multiplex data centers. An example pseudo-code representation of a product map and a family map for country-wide licensed use of software products in all data centers/CPCs in a country may be as follows:

```
public class CountryProductMap
{
    // Each CountryProductMap contains CountryName and two
Dictionaries:
    // - map of ProductID to FamilyName
    // - map of FamilyName to Family Info containing Cost Product ID,
Highest Version order and Product Count in this family
    // CountryProductMap is built for ALL CPCs of this Country in the
model by the CPCModel extension method CreateCountryMaps.
    ...
    public string Country { get; set; }
    [DataMember]
    public Dictionary<string, FamMapItem> FamilyMap { get; set; }
    [DataMember]
    public Dictionary<string, string> ProdToFam { get; set; }
}
```

Each of the individual data center (e.g., data center 100A, data center 100B, data center 100C) may include any number of CPCs/LPARs. FIG. 2 shows each of the individual data centers as including, for example, three individual CPCs (e.g., data center 100A includes CPC 1, CPC 2 and CPC 3; data center 100B includes CPC 4, CPC 5 and CPC 6; data center 100C includes CPC 7, CPC 8 and CPC 9) on which the customer's computing workload can be run.

System 20, one or more components of which may be hosted on respective client computers (e.g., client computer 12, client computer 22 and client computer 23) connected to each of the multiplex data centers 100A-100C, may include a collector component (e.g., collector component(s) 15 disposed in the client computers or data centers) for collecting raw performance data for each of the CPCs in data centers 100A-100C. The raw performance data may be collected using performance data collection and recording tools (e.g., RMF or SMF) that may be available in the individual data centers 100A-100C. The SMF data collected for CPU use, paging, and I/O activity may, for example, include type 30 records for job and job step processor resource use and types 70-79 RMF records. The raw performance data collected for the CPCs in data centers 100A-100C is shown in FIG. 2, for example, as "pelf. data 101A," "perf. data 102A" and "perf. data 103A" for data center 100A; as "perf. data 101B," "perf. data 102B" and "perf. data 103B for data center 100B; and as "perf. data 101C," "perf. data 102C" and "perf. data 103C for data center 100C.

Like system 10, system 20 may further include, for data center 100A, a preliminary processing component 110A coupled to a local data repository 120A, and a model building component 132A. One or more of these components may be hosted, for example, on a client computer (e.g., client computer 12) connected to data center 100A.

Preliminary processing component 110A may be configured to process the raw performance data collected for CPC 1, CPC 2 and CPC 3 (e.g., perf. data 101A, perf. data 102A and perf. data 103A, respectively) into formats suitable for input to model building component 132A. Preliminary processing component 110A may, for example, aggregate, filter, compress and normalize the raw performance data and store the processed performance data in a local data repository 120A for input to model building component 132A. Model building component 132A may use this processed performance data to assemble or build models 170A of data center resource use for each of CPC 1, CPC 2 and CPC 3 in data center 100A. The models which may be predictive may be used in a planning tool to create, schedule, execute, delay, or otherwise manage workloads to efficiently and economically use data center resources within data center 100A.

System 20 may similarly include, for data centers 100B and 100C, a preliminary processing component 110B coupled to a local data repository 120B, preliminary processing component 100C coupled to a local data repository 120C, and model building components 132B and 132C, respectively. One or more of these components may be hosted, for example, on respective client computers (e.g., client computers 22 and client computer 32) connected to data centers 100B and 100C. Preliminary processing component 110B may be configured to process the raw performance data collected for CPC 4, CPC 5 and CPC 6 (e.g., perf. data 101B, perf. data 102B and perf. data 103B, respectively) into formats suitable for input to model building component 132B. Preliminary processing component 110C may be configured to process the raw performance data collected for CPC 7, CPC 8 and CPC 9 (e.g., perf. data 101C, perf. data 102C and perf. data 103C, respectively) into formats suitable for input to model building component 132C. Model building component 132B may use the processed performance data to construct models 170B of data center resource use for each of CPC 4, CPC 5 and CPC 6 in data center 100B. The models, which may be predictive, may be used in a planning tool to create, schedule, execute, delay, or otherwise manage workloads to efficiently and economically utilize data center resources within data center 100B. Similarly, model building component 132C may use the processed performance data to construct models 170C of data center resource use for each of CPC 7, CPC 8 and CPC 9 in data center 100C. The models, which may be predictive, may be used in a planning tool to create, schedule, execute, delay, or otherwise manage workloads to efficiently and economically utilize data center resources within data center 100C.

In system 20, the model building components (e.g., model building components 132A-132C) may locally create the individual CPC models (e.g., models 170A-170C) for data centers 100A-100C, respectively.

In example implementations, the model building components (e.g., model building components 132A-132C) may map each version of a software product found in the performance data to a corresponding software product family, whose use may have been licensed as part of a corresponding software product family license across the multiplex data centers. If multiple software products found in the performance data for an individual CPC correspond to the same licensed software product family, the model building components (e.g., model building components 132A-132C) may create an "aggregated product" at the CPC level representing the multiple software products eligible for treatment under a same software product family license and additionally include the aggregated product in the individual CPC model (e.g., models 170A-170C) as representing all versions of the software product on the individual CPC. For example, if the performance data (e.g., for CPC 3 in data center 100A) includes software product DB2 version 2 and software product DB2 version 4, and both versions map to a licensed software product family (e.g., DB2 family), the model building components may additionally create an "aggregated software product DB2" at the CPC level in the individual CPC model and additionally include the aggregated product in the individual CPC model for CPC 3 in data center 100A.

Further, system 20 may further include a model merging process component 180, which may be configured to combine the individual CPC models (e.g., models 170A-170C) created by the model building components (e.g., model building components 132A-132C) for the individual data centers (e.g., data centers 100A-100C) into a single combined multiplex data centers model ("Multiplex/Data Center model 190") applicable to customer's computing workload across the multiplex data centers. Model merging process component 180 may be hosted, for example, on a client computer (e.g., client computer 42) at a central or external location connected to all of the individual client computers (e.g., client computers 12-32) or multiplex data centers (e.g., data centers 100A-100C) at the data center locations.

In an example implementation, model merging process component 180 may map each software product found in the individual CPC models (e.g., models 170A-170C) to a corresponding software product family, whose use may have been licensed as part of a corresponding software product family license across the multiplex data centers. If multiple software products are found in the data that map to the same licensed software product family, model merging process component 180 may create an "aggregated product" at the multiplex level representing the multiple software products eligible for treatment under a same software product family license, and additionally include the aggregated product in Multiplex/Data Center model 190 as representing all versions of the software product in the multiplex data centers.

For example, if the data of an individual CPC model (e.g. for CPC 1, data center 100A) includes software product DB2 version 6 and the data of another individual CPC model (e.g. for CPC 9, data center 100C) includes software product "DB2 version 7", and both versions map to a licensed software product family (e.g., DB2 family), model merging process component 180 may create an "aggregated software product DB2" at the multiplex level in Multiplex/Data Center model 190. It will be understood that software products that were identified as being aggregated products at the CPC level in the individual CPC models remain or become identified as aggregated products at the multiplex level in Multiplex/Data Center model 190.

System 20, like system 10, may further include, for example, a reporting process component 152. Reporting process component 152 may be configured to make the models (e.g. Multiplex/Data Center model 190) built by model merging process component 180 available to a planning tool or the customer from the central location, for example, as reports 162.

In an example implementation of system 20, reporting process component 152 may provide the customer with the Multiplex/Data Center model 190 in one of two user-selectable versions, for example, as a multiplex data centers version (e.g., a multiplex-data-centers" version), or as an individual data centers version (e.g., an "individual-data-centers" version).

Figure 3:
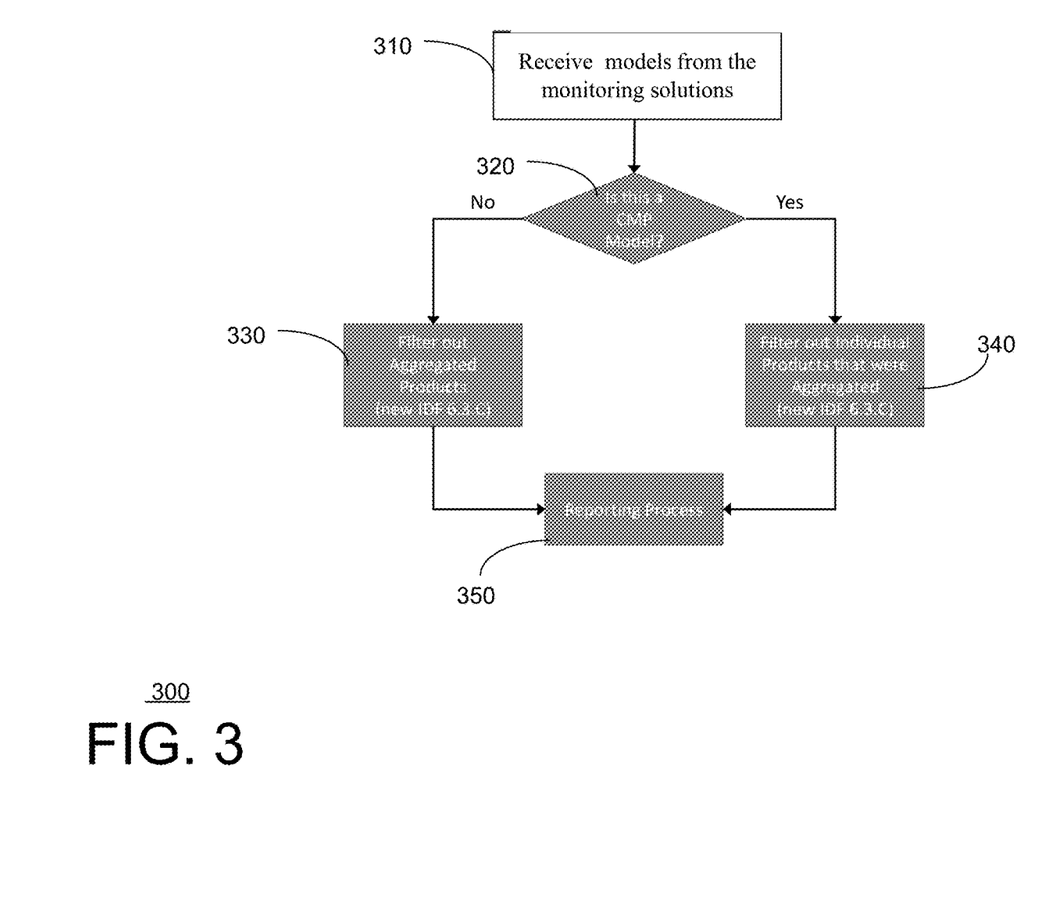
FIG. 3 is a flowchart illustrating an example method for generating user selected versions or modes of a multiplex data centers model, in accordance with the principles of the present disclosure.

FIG. 3 shows an example method 300, which may be used by model merging process component 180 (or reporting process component 152) to generate and report the user selected versions or modes of Multiplex/Data Center model 190. Method 300 may include receiving the model (310) and determining if a multiplex data centers version of the model is to be reported (320). If the multiplex data centers version is to be reported, method 300 may include filtering out of the received model all individual software products that are also represented by an aggregated product (e.g., at the CPC level or the multiplex level) in the model (340). If the individual data center version is to be reported, method 300 may include filtering out of the received model all aggregated products and leaving only individual software products in the model (330). Example method 300 may include reporting the model as filtered at 330 or 340 to the customer in reports 162 (350).

Figure 4:
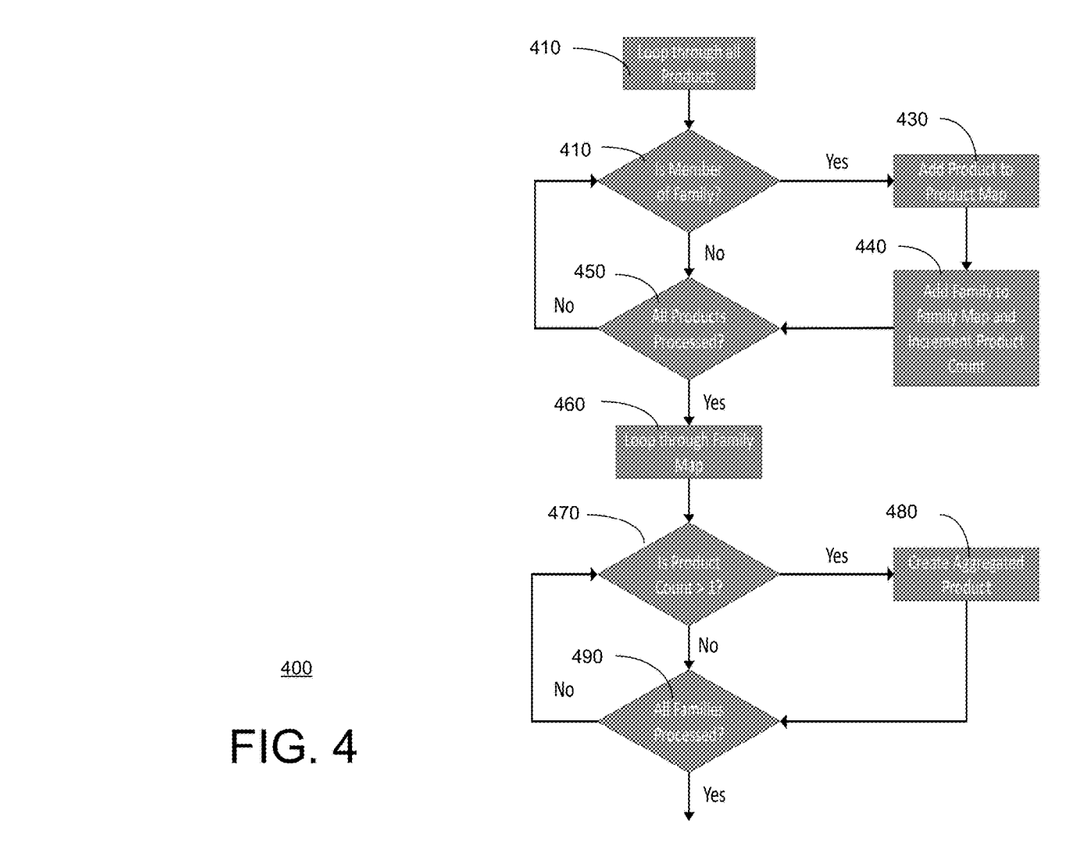
FIG. 4 is a flowchart illustrating an example method for generating product and product family maps used by model building components when creating aggregated products in an individual CPC model, in accordance with the principles of the present invention.

FIG. 4 shows an example method 400 for generating the product and family maps, which may be used (e.g., by model building components 132A-132C) when creating aggregated products in an individual CPC model. Method 400 may involve looping though all products in the individual CPC model, one-by-one (410), until all products have been processed (450).

In each loop, method 400 may involve checking if the product belongs to a licensed family of products (420). If the product belongs to a licensed family of products, method 400 may include adding the product to the product map (430), and adding the family to the family map and incrementing a product count for this family (440). If the product does not belong to a licensed family of products (420), method 400 may include determining if all products in the individual CPC model have been processed 450. If all products in the individual CPC model have been processed, method 400 may include looping through the family map, one-by-one (460), until all families have been processed (490). In each loop, method 400 may include checking if the product count for the family is greater than 1 (470). If the product count is greater than 1, method 400 may include creating an aggregate product for the family (480).

Figure 5:
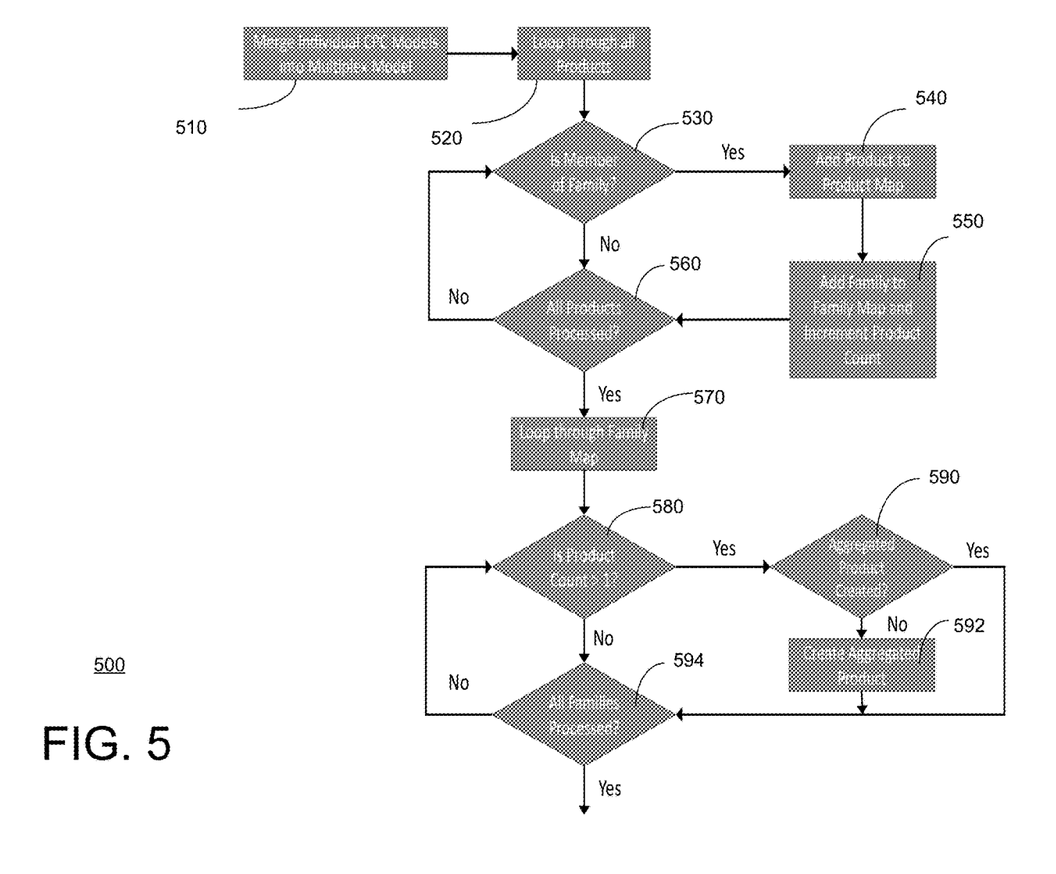
FIG. 5 is a flowchart illustrating an example method for defining or creating aggregated products at the multiplex level in a multiplex/data center model, in accordance with the principles of the present disclosure.

FIG. 5 shows an example method 500 for creating aggregated products at the multiplex level in Multiplex/Data Center model 190. Method 500 may involve merging individual CPC models into a multiplex model (510) and looping though all products in the multiplex model, one-by-one (520), until all products have been processed (560).

In each loop, method 500 may involve checking if the product belongs to a licensed family of products (530). If the product belongs to a licensed family of products, method 500 may include adding the product to the product map (540), and adding the family to the family map and incrementing a product count for this family (550). After determining that all products have been processed at 560, method 500 may include looping through the family map, one-by-one (570), until all families have been processed (594). In each loop, method 500 may include checking if the product count for the family is greater than 1 (580). If the product count is greater than 1, method 400 may include checking if an aggregate product (e.g., at the CPC level or from an earlier loop) already exists in the model (590). If an aggregate product does not exist, method 500 may include creating a new aggregate product at the multiplex level for the family (592).

The foregoing system 20 combines individual CPC models into a single multiplex data centers model, but permits simple switching the between a multiplex data centers version (e.g., "multiplex-data-centers" version) or mode and an individual CPC version (e.g., "individual-data-centers" version) or mode. The data resource use solution does not require rebuilding of individual CPC models when switching between the multiplex data centers and the individual CPC versions or modes.

By preparing the individual CPC models locally at the corresponding individual data centers (e.g., models 170A-170C), and only later on merging the individual CPC models to create the Multiplex/Data Center model 190 at a central location, the foregoing data resource use solution avoids the burden of transferring the voluminous RMF data used for model building from each of the data centers in the multiplex data centers to the central location for processing.

System 10 and system 20 described above may be viewed as model generators. While the foregoing discussion of the systems described model generation using historical performance data (e.g., perf. data 101C, perf. data 102C and perf. data 103C for data center 100C, FIG. 2) collected from the data centers as input to the model building components (e.g., model building components 132A-132C), it will be understood that systems 20 and 30 may be readily extended to generate models for potential change scenarios, for example, by providing simulated or test performance data for the potential changes scenario as input to the model building components (e.g., model building components 132A-132C), In example implementations system 10 and system 20 may include workload change evaluator components (e.g., workload change evaluator 44, FIG. 2) which may provide simulated or test performance data of a potential change as input to the model building components (e.g., model building components 132A-132C). The model generated based on the potential change data can be compared with the previously generated model to predict an impact of the potential change.

The models provided by the foregoing data resource use solutions can be used in a planning tool, for example, to evaluate capping, workload placement, workload volume changes across the multiplex data centers, identify workload priority in the systems, and measure impact of changes to batch workloads. The models may include a range of cost metrics for using data center resources, and allow use of the planning tool as a cost analyzer to reduce costs, for example, by identifying specific capacity use peaks and cost drivers.

In example implementations, the cost metrics utilized by the models may include a monthly peak value of a measured performance characteristic of CPU use (e.g., a 4 hour Rolling Average Million Service Units "4HRA MSU"). Other example cost metrics may, for example, include one or more of CMLC (Country Multiplex License Charges), AWLC (Advanced Workload License Charge), AEWLC (Advance Entry Workload License Charges), etc. In creating Multiplex/Data Center model 190, each of the cost metrics may effectively applied across all of the various CPCs in the multiple data centers and incorporated in Multiplex/Data Center model 190.

System 20 may be integrated with, for example, a mainframe workload or cost planning tool (some of which are available commercially such as BMC's mainframe cost optimization suite) to generate a baseline model (e.g., Multiplex/Data Center model 190) against which proposed or planned workload changes can be tested. Such integrated workload or cost planning tools may be used, for example, for monitoring, simulating or testing workload distributions and cost in the multiplex data centers.

Use of the multiplex data center model in the mainframe workload or cost planning tool may enable monitoring of the combined activity of all of the CPCs in multiple data centers.

In a trial, a test mainframe workload or cost planning tool was integrated with system 20 to generate a multiplex data center model (similar to Multiplex/Data Center model 190) for a test multiplex consisting of two individual CPCs (i.e. "BRAZOS" and "PHOENIX"). One version of a software product (i.e., "CICS TS for z/OS Version 5. Product ID is 5655-Y04") and several versions of a second software product of a product family (i.e. "DB2 for z/OS_ALL") were run on the test multiplex, and monitored by the test mainframe workload or cost planning tool with the multiplex data center model switched to the multiplex data centers mode.

Figure 6:
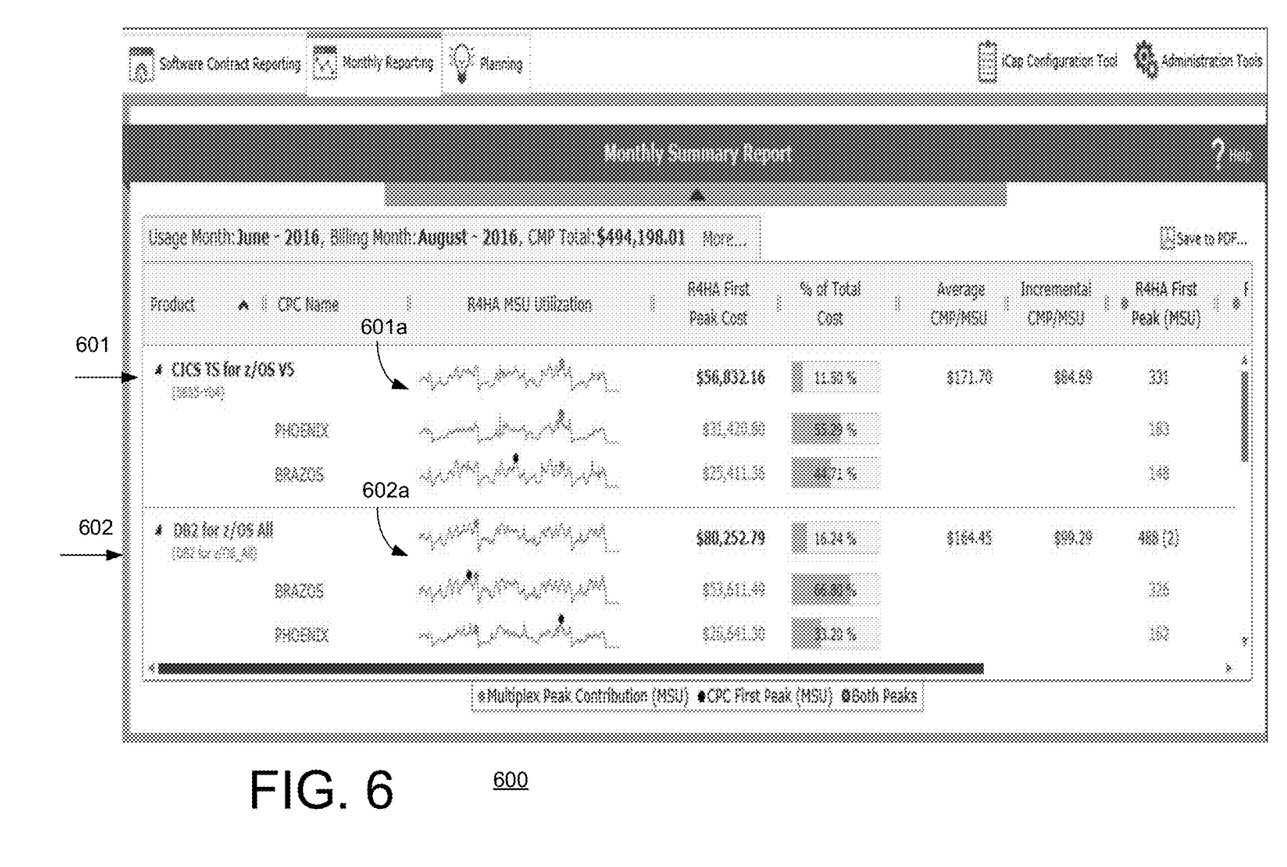
FIG. 6 is a screenshot of monthly summary report generated by a test mainframe workload or cost planning tool for a test multiplex, in accordance with the principles of the present disclosure.

FIG. 6 shows, for example, a screen shot 600 of a monthly summary report generated by the test mainframe workload or cost optimization tool for the test multiplex. As seen in the figure, monthly summary report 600 includes reports (e.g., reports 601 and 602) for the software products used. Only one version of the CICS product was present in the test multiplex and shown as such in report 601. In the report, the R4HA utilization activity chart (601a) shows activity on both CPCs (i.e. "BRAZOS" and "PHOENIX") of the single version of CICS present in the test multiplex. Several versions of the DB2 product were present in the test multiplex. Because the multiplex data center model was switched to the multiplex data centers mode in system 20, instead of showing reports for each individual product version, all versions of the DB2 product present were aggregated as a family (e.g., "DB2 for z/OS_ALL") and shown as such in report 602. In the report, the R4HA utilization activity chart (602a) represents combined activity on both CPCs of all versions of DB2 treated as one single product.

Figure 7:
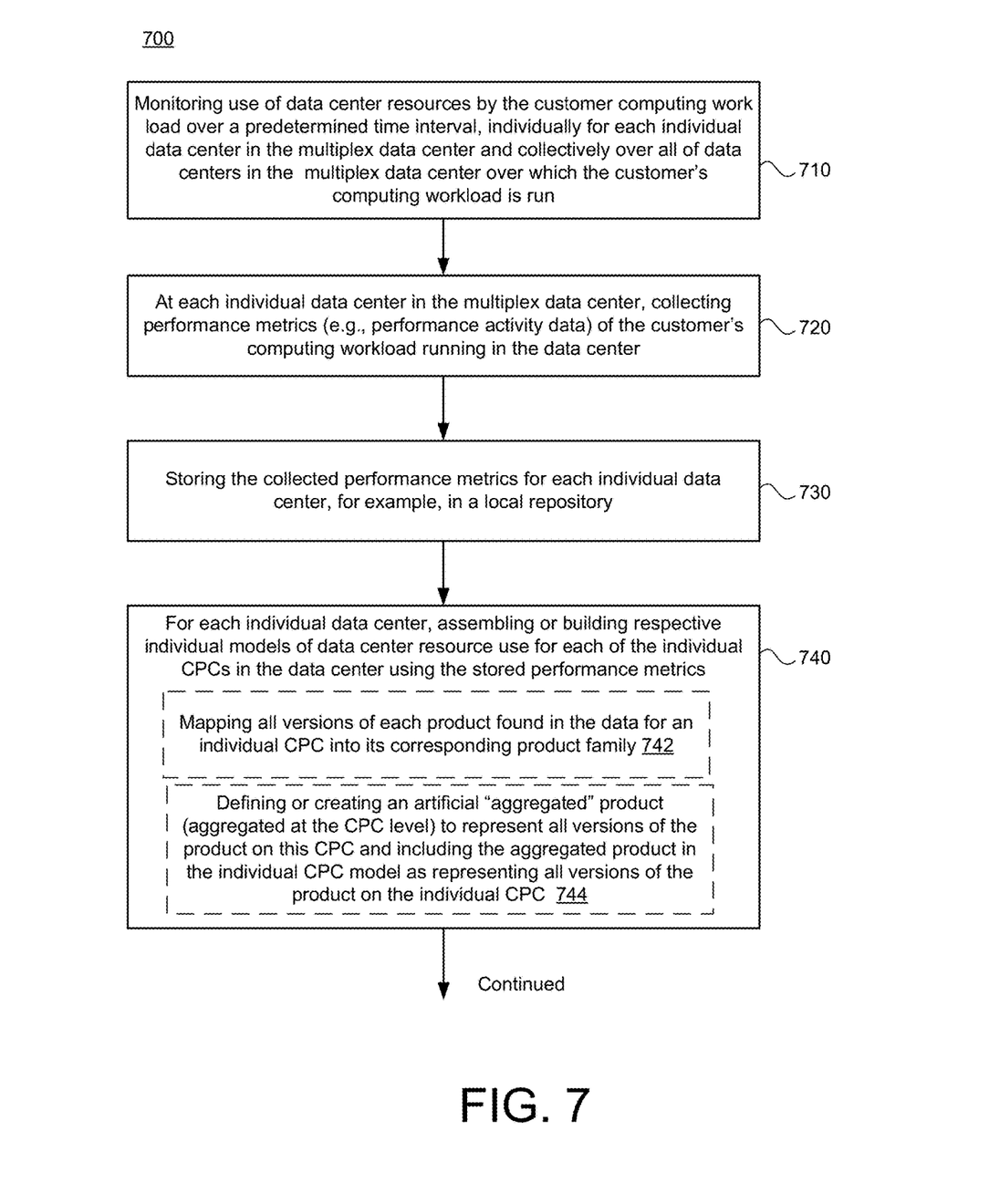
FIG. 7 is a flowchart illustrating an example method for monitoring and modeling data center resource use by a customer's computing workload across individual CPCs (or LPARs) in multiple data centers (multiplex data centers), in accordance with the principles of the present disclosure.

FIG. 7 shows an example method 700 for monitoring and modeling data center resource use by a customer's computing workload across individual CPCs (or LPARs) in multiple data centers (multiplex data centers), in accordance with the principles of the present disclosure.

The customer's computing workload may utilize different licensed software products, which may be run concurrently, sequentially, or at overlapping times on different CPCs (or LPARs) in each of the individual data centers in the multiplex data centers. Use of some software products for the customer's computing workload may be licensed individually product-by-product, for example, by product version, by individual CPC (or LPAR), or other criteria. Use of software products for the customer's computing workload may also be licensed as groups or families of products (e.g., a product family that includes all versions of the product) across all CPCs (or LPARs) in the multiplex data centers. In some instances, the customer may have an option of using a software product either under an individual product license, or, alternatively, under a product family license.

Method 700 may include monitoring use of data center resources by the customer computing work load over a predetermined time interval, individually for each individual data center in the multiplex data center and collectively over all data centers in the multiplex data center over which the customer's computing workload is run (710).

Method 700 further includes, at each individual data center in the multiplex data center, collecting performance metrics (e.g., performance activity data) of the customer's computing workload running in the data center (720); and storing the collected performance metrics for each individual data center, for example, in a local repository (730). Storing the collected performance metrics may include preliminarily processing the collected performance metrics to normalize, aggregate, or format the collected data.

Method 700 may further involve, for each individual data center, assembling or building respective individual models of data center resource use for each of the individual CPCs in the data center using the stored performance metrics (740).

Assembling or building the respective individual models of data center resource use for each of the individual CPCs in the data center using the stored performance metrics 740 may involve mapping all versions of each product found in the data for an individual CPC into its corresponding product family (742). When more than one product version maps to a product family for the individual CPC, method 700 may include defining or creating an artificial "aggregated" product (aggregated at the CPC level) to represent all versions of the product on this CPC and including the aggregated product in the individual CPC model as representing all versions of the software product on the individual CPC (744).

Method 700 may further involve combining the individual CPC models for the data centers in the multiplex data centers (including the individual CPC models with aggregated products) into a single multiplex data centers model (750). This may involve first receiving the individual CPC models for the data centers at a common location (e.g., a location external to the data centers) and combining or merging the individual CPC models at the common location into the single multiplex data centers model.

Combining or merging the individual CPC models for the data centers in the multiplex data centers 750 may further involve mapping each product found in the individual CPC models to a corresponding product family (752). When multiple products are found in the data that map to the same product family, method 700 may include defining or creating an artificial "aggregated" product (aggregated at the multiplex level) to represent these multiple products and additionally including the aggregated product in the single multiplex data centers model as representing these multiple products in the multiplex data centers (754).

Method 700 may further involve making the single multiplex data centers model available to other users (e.g., a planning tool or a customer) in one of two user-selectable versions or modes (i.e. a multiplex data centers version of the model, or an individual CPC version of the model) (770). If the multiplex data centers version is to be made available, method 700 may include filtering out of the single multiplex data centers model all individual software products that are also represented by an aggregated product (e.g., at the CPC level or the multiplex level) in the single multiplex data centers model (772). If the individual data center version is to be made available, method 700 may include filtering out of the single multiplex data centers model all aggregated products and leaving only individual software products in the model (774).

Implementations of the various techniques described herein may be implemented in digital electronic circuitry, or in computer hardware, firmware, software, or in combinations of them. Implementations may be implemented as a computer program product, i.e., a computer program tangibly embodied in a non-transitory information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A system including instructions stored on a non-transitory computer readable storage medium and executable by at least one processor, the system coupled to a plurality of individual data centers, each individual data center including one or more central processor complexes (CPCs), the system comprising:
   for each individual data center, a collector to collect performance metrics of a computing workload running on the one or more CPCs in the individual data center;
   for each individual data center, a preliminary processor to process the collected performance metrics and store the processed performance metrics in a local data repository;
   for each individual data center, a model-builder to build a respective individual model of data center resource use for each individual CPC of the individual data center using the locally stored performance metrics;
   a model-combiner to receive and combine the individual CPC models created at the individual data centers into a single model applicable to all versions of a software product of the computing workload running across the plurality of individual data centers;
   a reporter to make the single model available in user-selectable versions,
   wherein the user-selectable versions include a multiplex-data-centers model version of the single model and an individual-CPC model version of the single model; and
   a workload-change evaluator to evaluate an impact of a change in usage of data center resources by the computing workload with reference to a user-selectable version of the single model and, based on the evaluated impact, to distribute the computing workload across the plurality of individual data centers.

2. The system of claim 1, wherein the preliminary processor is configured to to normalize, aggregate, or format the collected performance metrics.

3. The system of claim 1, wherein each model-builder-is further configured to map all versions of each product found in the data for an individual CPC into a corresponding product family.

4. The system of claim 3, wherein the model-builder is further configured to:
   create an artificial aggregated product to represent the versions of the product on the individual CPC; and
   include the aggregated product in the individual CPC model as representing all versions of the product on the individual CPC.

5. The system of claim 1, wherein the model-combiner is further configured to map each product found in the individual CPC models to a corresponding product family.

6. The system of claim 5, wherein the model-combiner is further configured to:
   when multiple products are found in the data that map to a same product family, an artificial aggregated product to represent the found multiple products; and
   additionally, include the aggregated product in the single model as representing the found multiple products in the plurality of individual data centers.

7. The system of claim 1, wherein the reporter is further configured to:
   when the multiplex-data-centers model version is to be made available, filter out of the single model all individual software products that are also represented by an aggregated product in the single model.

8. The system of claim 1, wherein the reporter is further configured to:
   when the individual-CPC model version is to be made available, filter out of the single model all aggregated products and leave only individual software products in the single model.

9. The system of claim 1, wherein the one or more CPCs are mainframe computers.

10. A method for distributing a computing workload across a plurality of individual data centers, each of the individual data centers including one or more central processor complexes (CPCs), the method comprising:
    monitoring use of data center resources by the computing work load over a predetermined time interval, individually for each individual data center and collectively over the plurality of individual data centers over which the computing workload is run;
    at each individual data center, collecting performance metrics of the computing workload running in the individual data center, processing the collected performance metrics, and storing the processed performance metrics in a local data repository;
    at each individual data center, building a respective individual model of data center resource use for each individual CPC in the individual data center using the stored performance metrics;
    combining the individual CPC models for the individual data centers into a single model applicable to all versions of a software product of the computing workload running across the plurality of individual data centers;
    making the single model available in one of two user-selectable versions, wherein the user-selectable versions include a multiplex-data-centers model version of the single model and an individual-CPC model version of the single model; and evaluating an impact of a change in usage of data center resources by the computing workload with reference to a user-selectable version of the single model and, based on the evaluated impact, distributing the computing workload across the plurality of data centers.

11. The method of claim 10, wherein processing the collected performance metrics incudes normalizing, aggregating, or formatting the collected performance metrics.

12. The method of claim 10, wherein building a respective individual model of data center resource use for each individual CPC includes mapping all versions of each product found in the data for an individual CPC into its corresponding product family.

13. The method of claim 10, further comprising:
creating an artificial aggregated product to represent all versions of the product on the individual CPC; and
including the aggregated product in the individual CPC model as representing all versions of the product on the individual CPC.

14. The method of claim 10, wherein combining the individual CPC models for the individual data centers into a single model includes mapping each product found in the individual CPC models to a corresponding product family.

15. The method of claim 14, further comprising:
when multiple products are found in the data that map to a same product family, creating an artificial aggregated product to represent the found multiple products; and
additionally, including the aggregated product in the single model as representing the found multiple products in the plurality of individual data centers.

16. The method of claim 15, wherein if the multiplex-data-centers model version is to be made available, the method further comprises filtering out of the single model all individual software products that are also represented by an aggregated product in the single model.

17. The method of claim 15, wherein if the individual-CPC model version is to be made available, the method further comprises filtering out of the single model all aggregated products and leaving only individual software products in the model.

18. The method of claim 17, wherein building a respective individual model of data center resource use for each individual CPC in the individual data center includes building a respective individual model locally at the individual data center, and transmitting the locally built model to an external location for combining the individual CPC models for the plurality of individual data centers into a single model.

19. A computer program product for distributing a computing workload across a plurality of individual data centers, each of the individual data centers including one or more central processor complexes (CPCs), the computer program product including instructions recorded on a non-transitory computer readable storage medium and configured to cause at least one processor to:
monitor use of data center resources by the computing work load over a predetermined time interval, individually for each individual data center and collectively over the plurality of individual data centers over which the computing workload is run;
at each individual data center, collect performance metrics of the computing workload running in the individual data center, process the collected performance metrics, and store the processed performance metrics in a local data repository;
at each individual data center, build a respective individual model of data center resource use for each individual CPC of the individual data center using the locally stored performance metrics;
combine the individual CPC models built at the individual data centers into a single model applicable to all versions of a software product of the computing workload running across the plurality of individual data centers;
make the single model available in one of two user-selectable version, wherein the user-selectable versions include a multiplex-data-centers model version of the single model and an individual-CPC model version of the single model; and
evaluate an impact of a change in usage of data center resources by the computing workload with reference to a user-selectable version of the single model and distribute the computing workload across the plurality of data centers based on the evaluated impact.

20. The computer program product of claim 19, wherein the instructions, when executed, are further configured to cause the at least one processor to:
preliminarily process the collected performance metrics to normalize, aggregate, or format the collected performance metrics.

21. The computer program product of claim 19, wherein the instructions, when executed, are further configured to cause the at least one processor to:
when building a respective individual model of data center resource use for each individual CPC, map all versions of each product found in the data for an individual CPC into its corresponding product family.

22. The computer program product of claim 21, wherein the instructions, when executed, are further configured to cause the at least one processor to:
create an artificial aggregated product to represent all versions of the product on the individual CPC; and
include the aggregated product in the individual CPC model as representing all versions of the product on the individual CPC.

23. The computer program product of claim 22, wherein the instructions, when executed, are further configured to cause the at least one processor to:
when combining the individual CPC models for the individual data centers in the multiplex data center into a single model, map each product found in the individual CPC models to a corresponding product family.

24. The computer program product of claim 23, wherein the instructions, when executed, are further configured to cause the at least one processor to:
when multiple products are found in the data that map to a same product family, create an artificial aggregated product to represent the found multiple products; and
additionally, include the aggregated product in the single model as representing the found multiple products in the plurality of individual data centers.

25. The computer program product of claim 24, wherein the instructions, when executed, are further configured to cause the at least one processor to:
when the multiplex-data-centers model version is to be made available, filter out of the single model all individual software products that are also represented by an aggregated product in the single model.

26. The computer program product of claim 24, wherein the instructions, when executed, are further configured to cause the at least one processor to:

when the individual-CPC model version is to be made available, filter out of the single model all aggregated products and leave only individual software products in the model.

* * * * *

UNITED STATES PATENT AND TRADEMARK OFFICE
CERTIFICATE OF CORRECTION

PATENT NO. : 10,346,204 B2
APPLICATION NO. : 15/272011
DATED : July 9, 2019
INVENTOR(S) : Ginis et al.

Page 1 of 1

It is certified that error appears in the above-identified patent and that said Letters Patent is hereby corrected as shown below:

In the Claims

In Column 14, Claim 2, Line 4, delete "to to" and insert -- to --, therefor.

In Column 14, Claim 6, Line 24, delete "an" and insert -- create an --, therefor.

Signed and Sealed this
Seventeenth Day of September, 2019

Andrei Iancu
*Director of the United States Patent and Trademark Office*